United States Patent [19]

Rapp

[11] 4,406,681

[45] Sep. 27, 1983

[54] METHOD OF MAKING MANGANESE SENSITIZED NEODYMIUM FLUORESCENT GLASSES

[75] Inventor: Charles F. Rapp, Newark, Ohio

[73] Assignee: Schott Optical Glass, Inc., Duryea, Pa.

[21] Appl. No.: 70,596

[22] Filed: Aug. 29, 1979

[51] Int. Cl.³ .............................................. C03B 5/22
[52] U.S. Cl. ........................................ 65/32; 65/134; 252/301.4 P; 252/301.4 F; 501/64
[58] Field of Search ...................... 65/32, 134; 106/52; 252/301.4 P, 301.4 F; 501/64

[56] References Cited

U.S. PATENT DOCUMENTS

| | | | |
|---|---|---|---|
| 3,549,554 | 12/1970 | Hirayama et al. | 106/52 X |
| 3,580,859 | 5/1971 | Buzhinsky et al. | 252/301.4 P |
| 3,716,349 | 2/1973 | Deeg et al. | 65/32 |
| 3,928,229 | 12/1975 | Neuroth | 106/52 X |
| 4,002,449 | 1/1977 | Spanoudis | 65/32 |

*Primary Examiner*—Arthur D. Kellogg
*Attorney, Agent, or Firm*—Millen & White

[57] ABSTRACT

Disclosed is a process for preparing fluorescent inorganic glasses containing $Nd_2O_3$ as a fluorescent species and containing MnO as a sensitizer but containing essentially no higher oxides of manganese. In the disclosed process an internal reducing agent is employed in the melting of the glass and such agent reduces the higher oxides of manganese upon cooling of the melt.

14 Claims, 6 Drawing Figures

METHOD OF MAKING MANGANESE SENSITIZED NEODYMIUM FLUORESCENT GLASSES

Fluorescent glasses containing $Nd_2O_3$ are widely known, and many such glasses are useful for, and are used for, making laser rods and discs. All such glasses which are made by the process of the present invention can also be used in luminescent solar collectors, which are useful for concentrating light emitted on excitation of the neodymium and converting such emitted light to electricity. See as an example the photovoltaic device incorporating a luminescent solar collector of neodymium fluorescent laser glass, described in Levitt and Weber, Applied Optics, Vol. 16, No. 10, October 1977.

It has also been disclosed that $Mn^{2+}$ sensitizes $Nd^{3+}$ in certain fluorescent glasses. See Shionoya et al., Applied Physics Letters, Mar. 15, 1965, pp. 117–118; Melamed et al., Applied Physics Letters; Sept. 15, 1965, pp. 170–172 and U.S. Pat. No. 3,549,554 by two of the authors of the latter paper; Parke et al., Physics and Chemistry of Glasses, October, 1977, pp. 125–131; and a government contract report to be mentioned hereinafter, said report having a coauthor who is an inventor of said patent and a coauthor of said Melamed et al. paper. In the patent and in the Parke et al. paper, reducing organic ingredients are included in the batch materials.

Such fluorescent glasses have been up to now not possible to prepare as glasses of highly uniform composition of good optical quality, because they could not be prepared in platinum using the reducing conditions thought necessary for reducing higher oxides of manganese, as will be discussed hereafter.

It is an object of the present invention to provide a process for preparing fluorescent inorganic glasses of good quality containing $Nd_2O_3$ as a fluorescent or luminescent species, sensitized by divalent manganese oxide and essentially free of higher oxides of manganese.

It is another object of the present invention to provide such a process, including melting such a glass in contact with platinum or a platinum alloy as the furnace material.

Other objects, as well as aspects and advantages, of the present invention will be apparent from this specification including the figures and the claims.

In the past in the laboratory preparation of such fluorescent glasses it has not been possible to use platinum or platinum alloys as the furnace container in contact with the melt under the prevailing reducing conditions, because in the case of phosphate glasses the platinum is severely corroded and usually disintegrated and in the case of non-phosphate glasses under such reducing conditions, scattering centers or tubidity result. The melting of phosphate and non-phosphate glasses under such conditions in inorganic refractories results in non-uniformity and striations caused by the constant dissolution of the refractory, as well as other problems. See the Westinghouse government contract report cited hereinafter in detail.

The present invention solves the foregoing problems in making a fluorescent glass containing $Nd_2O_3$ and MnO.

According to the present invention there is provided an improvement in the method of preparing an inorganic luminescent glass that contains $Nd_2O_3$ as a fluorescent species, sensitized by MnO, and that is essentially free of oxides of Mn having a valence greater than +2, which comprises essentially eliminating such higher valence Mn oxides inherently present in such a glass in the molten state, by providing as an internal reducing agent homogeneously dissolved in a melt of such a glass, an oxide of a metal more easily oxidized than MnO as essentially the sole effective agent for eliminating such higher oxides of Mn from said glass, and cooling said glass melt to a solid glass, during which cooling the said higher oxides of Mn present in the glass melt are reduced by said internal reducing agent.

Thus, according to the present invention an internal reducing agent is employed, i.e., a reducing agent that is homogeously dissolved in, and is part of, the homogeneous glass melt. This is to be contrasted with reducing agents such as an ambient reducing gaseous atmosphere or agents such as carbon that can react with excess oxygen and thus result in reducing conditions, or ammonium compounds or metallo-organic compounds such as metal carboxylates or metal alcoholates, which compounds both decompose to various reducing compounds such as carbon, reducing gases, etc.; all of which reducing agents are essentially not dissolved in the glass as part of the glass and are thus "external" reducing agents.

Thus, when using the internal reducing agents it is possible, and it is preferred, to use mildly oxidizing or strongly oxidizing ambient furnace conditions during the melting and to effect the conversion of the equilibrium amount of higher manganese oxides, present at the high melting temperatures, to MnO by internal reduction with said internal reducing agents during cooling of the glass melt to a solid glass. This makes it possible to carry out the melting of such a glass in platinum or a platinum alloy, as is preferred.

It is within the broad scope of the invention, although not preferred, to effect the melting according to the invention in the presence of an ambient atmosphere or environment which is a slightly reducing ambient atmosphere or environment, so long as the ambient atmosphere conditions are such that during cooling of the melt the higher oxides of manganese present in the melt at the melting temperature are in fact reduced by said internal reducing agent during cooling to a solid glass, as contrasted to prior reduction by the external reducing environment or atmosphere during said melting process.

The now preferred internal reducing agents are tin oxide expressed as SnO, antimony oxide expressed as $Sb_2O_3$ and arsenic oxide expressed as $As_2O_3$. These oxides are present in the melt of the glass, but can be gotten into the glass melt in any manner. At the elevated temperatures of the molten glasses the named oxides will be present in an equilibrium proportion with higher oxides, whether or not charged as the named oxide or as a higher valent oxide or as a metallo-organic compound that forms the oxide of the metal in situ.

The examples of the method of the invention presented hereafter are illustrative but should not be taken as limiting the broad scope of the invention as disclosed and claimed.

In Tables 1 and 2, compositions 3, 4, 5, 7, 9, 10, 13, 16 and 17 are examples of neodymium fluorescent glasses sensitized with MnO, made according to the process of the present invention, while glasses 1, 2, 6, 8, 11, 12, 14 and 15 are presented for comparative purposes. This table will be discussed in more detail.

The following Examples 1 and 2 are specific examples of fluorescent glasses successfully prepared according to the method of the present invention.

EXAMPLE 1

A fluorescent glass having the constituents set forth for composition 5 of Table 1 was prepared from the following batch ingredients:

| | Parts by Weight |
|---|---|
| Aluminum metaphosphate (1) | 1006.410 |
| Monopotassium orthophosphate (2) | 2772.055 |
| Orthophosphoric acid (3) | 1462.147 |
| Neodymium oxide (4) | 149.555 |
| Lanthanum oxide (5) | 125.814 |
| Manganous carbonate (6) | 368.433 |
| Antimony trioxide (reagent grade) | 56.107 |

(1) $Al_2O_3$ 19.50, $Fe_2O_3$ 0.0008, $P_2O_5$ 78.85 weight percent
(2) $P_2O_5$ 52.81, $K_2O$ 34.89, and $Fe_2O_3$ 0.001, weight percent, balance water
(3) $P_2O_5$ 61.80, $Fe_2O_3$ 0.0007, balance water
(4) $Nd_2O_3$ 99.60, $Fe_2O_3$ 0.0001 weight percent
(5) $La_2O_3$ 99.69, $Fe_2O_3$ 0.0002 weight percent
(6) MnO 61.74, $Fe_2O_3$ 0.0016 weight percent The solid ingredients were blended and then mixed with stirring and gentle heating into the orthophosphoric acid to form a thick slurry. The walls of the mixing container were glass and a plastic stirrer was used.

This slurry was poured into a number of Teflon lined molds about 3 inches in diameter by about 1 inch deep. On cooling the slurry solidified to form solid patties of the raw material batch.

In an electric furnace set at 2100° F. was placed a silica container with an initial portion of the patties and then incremental portions about every 30 minutes over a total charging period of one hour and 30 minutes. Charging in increments is necessitated by the violent evolution of water contained in the batch material. Heating was continued for about 60 more minutes to allow further evolution of water. Then preheated high density alumina tubes were lowered into the melt and dry air was bubbled through the melt for about 15.5 hours, after which the melt was cast onto cold rollers to make chips of the glass. These chips were then charged to a covered platinum crucible and heated with stirring in an elecric furnace for a further period of about 6.5 hours at 2000° F. furnace temperature. During this melting and homogenizing period the space above the melt was flushed with 0.75 CFH of a dry mixture of 5 percent $O_2$, 95 percent $N_2$. The melt was cooled to about 1780° F. and then cast into discs and a slab. Polished rectangular samples were ground to be used in the various transmission, absorption and excitation tests to be described herein.

EXAMPLE 2

A fluorescent glass having the constituents set forth for composition 13 of Table 2 was prepared from the following batch ingredients:

| | Parts by Weight |
|---|---|
| Quartz (1) | 347.393 |
| Alumina (2) | 8.005 |
| Sodium carbonate (3) | 109.925 |
| Calcium oxide (4) | 46.339 |
| Neodymium oxide (5) | 18.596 |
| Manganous carbonate (6) | 18.070 |
| Stannous oxide (7) | 5.296 |

(1) $SiO_2$ 99.98, $Al_2O_3$ 0.006, $Fe_2O_3$ 0.0004, $Na_2O$ 0.0014, $K_2O$ 0.0005, $Li_2O$ 0.0006 weight percent
(2) $Al_2O_3$ 99.90, $Fe_2O_3$ 0.0023, $Na_2O$ 0.002, $K_2O$ 0.0015, $Li_2O$ 0.0003 weight percent
(3) $Na_2O$ 58.21, $Fe_2O_3$ 0.0005 weight percent
(4) CaO 98.59, $Na_2O$ 0.001, $Fe_2O_3$ 0.0007 weight percent
(5) $Nd_2O_3$ 99.60, $Fe_2O_3$ 0.0001 weight percent
(6) MnO 61.74, $Fe_2O_3$ 0.0016 weight percent
(7) SnO 100.00, $Fe_2O_3$ 0.0026 weight percent The above ingredients were essentially uniformly mixed and then in several increments charged to a platinum crucible in an electric furnace set at a furnace temperature of 2700° F. in an air atmosphere. The batch was added in increments over a 35 minute period. Melting was continued for about an hour and a half and then hand stirring carried out; melting then continued for another 3.25 hours and a second hand stirring made. Thereafter the melt was continued at this same furnace temperature for another 16.5 hours, after which the melt was cast to form patties. Polished rectangular samples were ground to be used in the various transmission, absorption and excitation tests to be described herein.

TABLE 1

| Component/Mol Parts | 1 | 2 | 3 | 4 | 5 | 6 | 7 | 8 | 9 | 10 |
|---|---|---|---|---|---|---|---|---|---|---|
| $P_2O_5$ | 60.0 | 60.0 | 60.0 | 60.0 | 60.0 | 55.0 | 55.0 | 55.0 | 55.0 | 49.0 |
| $Al_2O_3$ | 5.0 | 5.0 | 5.0 | 5.0 | 5.0 | 5.0 | 5.0 | 10.0 | 10.0 | 5.0 |
| $Li_2O$ | | | | | | | | 26.67 | 26.67 | |
| $K_2O$ | 26.67 | 26.67 | 26.67 | 26.67 | 26.67 | 26.67 | 26.67 | | | 19.0 |
| MgO | | | | | | | | 8.33 | | |
| BaO | 8.33 | 6.33 | 6.33 | 6.33 | | 13.33 | | | | |
| $La_2O_3$ | 1.0 | 1.0 | 1.0 | 1.0 | 1.0 | | | | | |
| $Nd_2O_3$ | 1.0 | 1.0 | 1.0 | 1.0 | 1.15 | 1.0 | 1.10 | 1.0 | 0.95 | 1.04 |
| MnO | | 2.0 | 2.0 | 2.0 | 8.33 | | 13.33 | | 8.33 | 25.0 |
| SnO | | | 0.5 | | | | | | | |
| $Sb_2O_3$ | | | | 0.5 | 0.5 | | 0.75 | | 0.5 | 1.0 |
| λ,A | RELATIVE PUMPING EFFICIENCY | | | | | | | | | |
| 3502 | 0.82 | | | | 0.86 | 0.76 | 0.63 | 0.64 | 0.75 | 0.58 | 0.57 |
| 3563 | 0.96 | | | | 0.92 | 0.87 | 0.67 | 0.79 | 0.91 | 0.73 | 0.71 |
| 4100 | — | | | | 0.95 | 0.69 | — | 0.63 | — | 0.64 | 0.64 |
| 4292 | 0.65 | | | | 0.99 | 0.73 | 0.64 | 0.65 | 0.90 | 0.70 | 0.63 |
| 4708 | 0.93 | | | | 1.21 | 0.81 | 0.97 | 0.74 | 0.81 | 0.86 | 0.65 |
| 5110 | 0.90 | | | | 1.04 | 0.83 | 0.87 | 0.81 | 0.85 | 0.92 | 0.76 |
| 5240 | 0.92 | | | | 1.10 | 0.87 | 0.90 | 0.69 | 0.86 | 0.94 | 0.81 |
| 5835 | 1.01 | | | | 1.15 | 1.04 | 1.03 | 1.00 | 1.16 | 1.02 | 1.05 |
| 7460 | 1.01 | | | | 0.95 | 0.99 | 1.00 | — | 0.91 | 1.01 | 0.98 |
| 8000 | 0.98 | | | | 0.90 | 0.87 | 0.96 | — | 0.93 | 0.97 | 0.97 |

TABLE 2

| Component/Mol Parts | 11 | 12 | 13 | 14 | 15 | 16 | 17 |
|---|---|---|---|---|---|---|---|
| $SiO_2$ | 73.51 | 73.51 | 73.51 | 60.0 | 60.0 | 60.0 | 60.0 |
| $Al_2O_3$ | 1.0 | 1.0 | 1.0 | 2.5 | 2.5 | 2.5 | 2.5 |
| $Na_2O$ | 13.13 | 13.13 | 13.13 | | | | |
| $Li_2O$ | | | | 27.5 | 27.5 | 27.5 | 27.5 |
| CaO | 10.36 | 10.36 | 10.36 | 10.0 | 8.0 | 8.0 | 8.0 |
| $Nd_2O_3$ | | | 0.7 | 0.5 | 0.5 | 0.5 | 0.5 |
| MnO | 2.0 | 2.0 | 2.0 | | 2.0 | 2.0 | 2.0 |
| SnO | | 0.5 | 0.5 | | | 0.5 | |
| $Sb_2O_3$ | | | | | | | 0.5 |

TABLE 3

| $\lambda_p$ | $I_I$ | $I_T$ | $T_\lambda \left(\frac{I_T}{I_I}\right)$ | $IT_\lambda$ | $A_\lambda$ $(1-IT_\lambda)$ | $E_I$ | $E_A$ $(E_I A_\lambda)$ | $\chi_A$ $(E_A \lambda_p)$ | F1 1.06 | Pump Eff. (F1 1.06) / $\chi_A$ | \|Pump Eff.\| |
|---|---|---|---|---|---|---|---|---|---|---|---|
| 3502 | 63.5 | 7.5 | 0.118 | 0.128 | 0.872 | 4.95 | 4.31 | 1.51 | 49.3 | 32.65 | 0.76 |
| 3563 | 70.6 | 8.0 | 0.113 | 0.123 | 0.877 | 4.66 | 4.09 | 1.46 | 54.8 | 37.53 | 0.87 |
| 4100 | 62.0 | 43.2 | 0.697 | 0.757 | 0.243 | 11.94 | 2.90 | 1.19 | 35.5 | 29.83 | 0.69 |
| 4292 | 58.9 | 39.5 | 0.671 | 0.729 | 0.271 | 14.53 | 3.94 | 1.69 | 53.2 | 31.48 | 0.73 |
| 4708 | 37.4 | 25.0 | 0.668 | 0.727 | 0.273 | 3.72 | 1.02 | 0.479 | 16.7 | 34.86 | 0.81 |
| 5110 | 44.7 | 14.6 | 0.327 | 0.355 | 0.645 | 4.20 | 2.71 | 1.38 | 49.6 | 35.94 | 0.83 |
| 5240 | 49.5 | 8.5 | 0.172 | 0.187 | 0.813 | 4.43 | 3.60 | 1.89 | 70.8 | 37.46 | 0.87 |
| 5835 | 34.8 | 0.4 | 0.011 | 0.012 | 0.988 | 2.90 | 2.86 | 1.67 | 74.9 | 44.85 | 1.04 |
| 7460 | 31.8 | 1.1 | 0.035 | 0.038 | 0.962 | 4.57 | 4.40 | 3.28 | 140.7 | 42.91 | 0.99 |
| 8000 | 33.7 | 0.6 | 0.018 | 0.019 | 0.981 | 4.60 | 4.51 | 3.61 | 151.5 | 41.97 | 0.97 |

Compositions 3, 4, 7, 9, 10, 16 and 17 were prepared in a similar manner according to the process of the present invention. In all cases an oxidizing atmosphere was employed during the melting of the glasses.

Certain tests were carried out on the polished rectangular samples of each composition shown in Tables 1 and 2.

Figure 6:
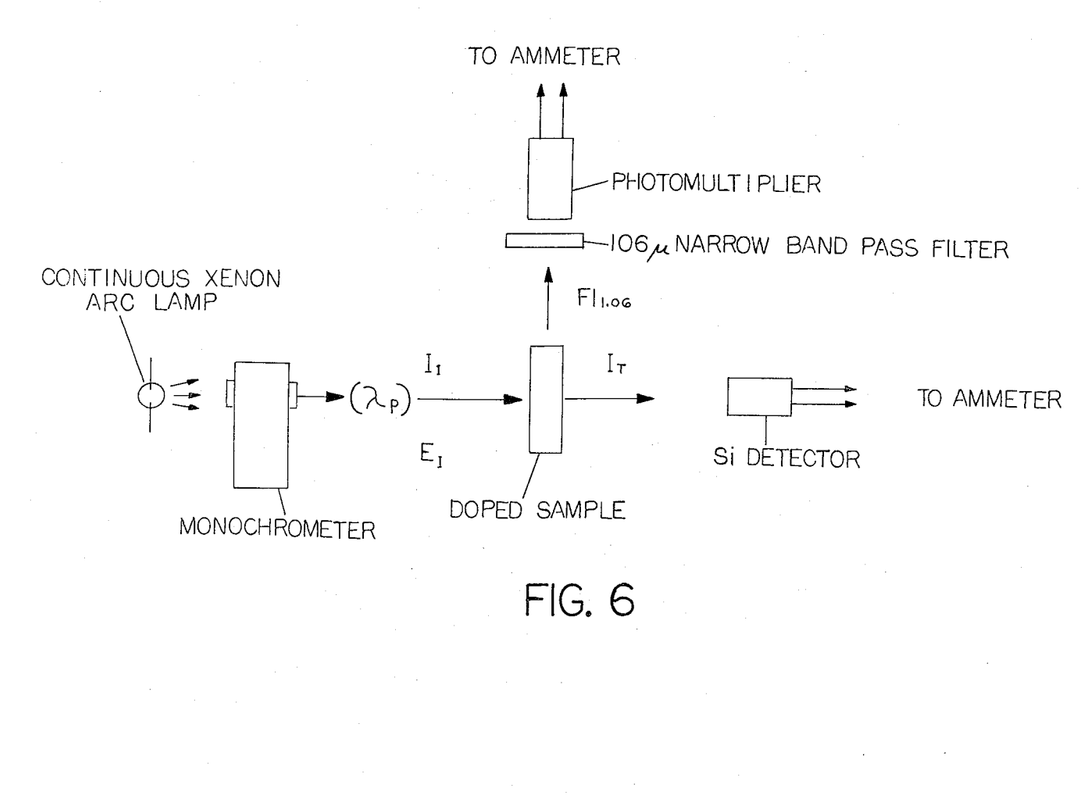
FIG. 6 schematically shows the experimental scheme used in testing the glasses to obtain the transmission and excitation curves and the other data reported herein for the various compositions.

The symbols used in FIG. 6 and in Table 3, to be discussed hereafter, have the following definitions:

$\lambda_p$ is the wavelength of the excitation light in angstrom units.

$I_I$ is the Si detector current produced by the light incident on the sample.

$I_T$ is the Si detector current produced by the light transmitted through the sample.

$E_I$ is the relative energy of the light incident on the sample. ($E_I$ can be obtained from $I_I$ by multiplying the $I_I$ values by the detector sensitivity at each wavelength.)

$Fl_{1.06}$ is the relative fluorescent intensity at $1.06\mu$ produced in the sample when excited at the various pump wavelengths.

$T_\lambda = \frac{I_T}{I_I}$ = sample transmission at each wavelength.

$IT_\lambda = \frac{I_T}{I_I} \div 0.92$ = internal transmission (transmission of the sample corrected for reflection losses.)

$A_\lambda = 1 - IT_\lambda$ = sample absorption at each wavelength.

$E_A = E_I A_\lambda$ = relative energy absorbed by the sample at each pump wavelength.

$\chi_A = E_A \lambda_p$ = relative number of photons absorbed by the sample at each pump wavelength.

Pump. Eff. $= \frac{Fl_{1.06}}{\chi_A}$ = relative pumping efficiency at each wavelength (relative number of photons emitted at $1.06\mu$ per photon absorbed at each pump wavelength)

|Pump Eff.| = relative pumping efficiency normalized so that the average of the 5835 Å, 7460 Å and 8000 Å bands is 1.00

Transmission spectra of each of the glasses in Tables 1 and 2 was obtained, covering from the near ultraviolet to well over 20,000 angstrom units. A portion of these transmission spectra for compositions 1 and 5 are shown in FIGS. 1 and 2, respectively, and will be discussed later.

The spectra of glass 2 showed absorption bands corresponding to oxides of manganese higher than +2, including significant absorption at wavelengths bracketing 10600Å, a main output fluorescent band of neodymium +3. The same is true of glass compositions 11 and 15. These 3 compositions contained neodymium oxide, manganese oxide and they contained no internal reducing agent of the invention in the melting and forming of the glasses. On the other hand, all of the rest of the compositions of Tables 1 and 2 showed no measurable absorption in the area around 10600Å wavelength, indicating the absence of oxides of manganese having a valence over 2. Of course, compositions 1, 6, 8 and 14 did not contain any manganese oxide in any event.

Thus, in the examples of the invention represented by the pertinent compositions of Tables 1 and 2, MnO was present to sensitize the neodymium oxide, and higher oxides of Mn were absent, showing that the metal oxide reducing agents did successfully cause the reduction of higher manganese oxides to MnO during cooling of the molten glass to a solid glass.

Figure 1:
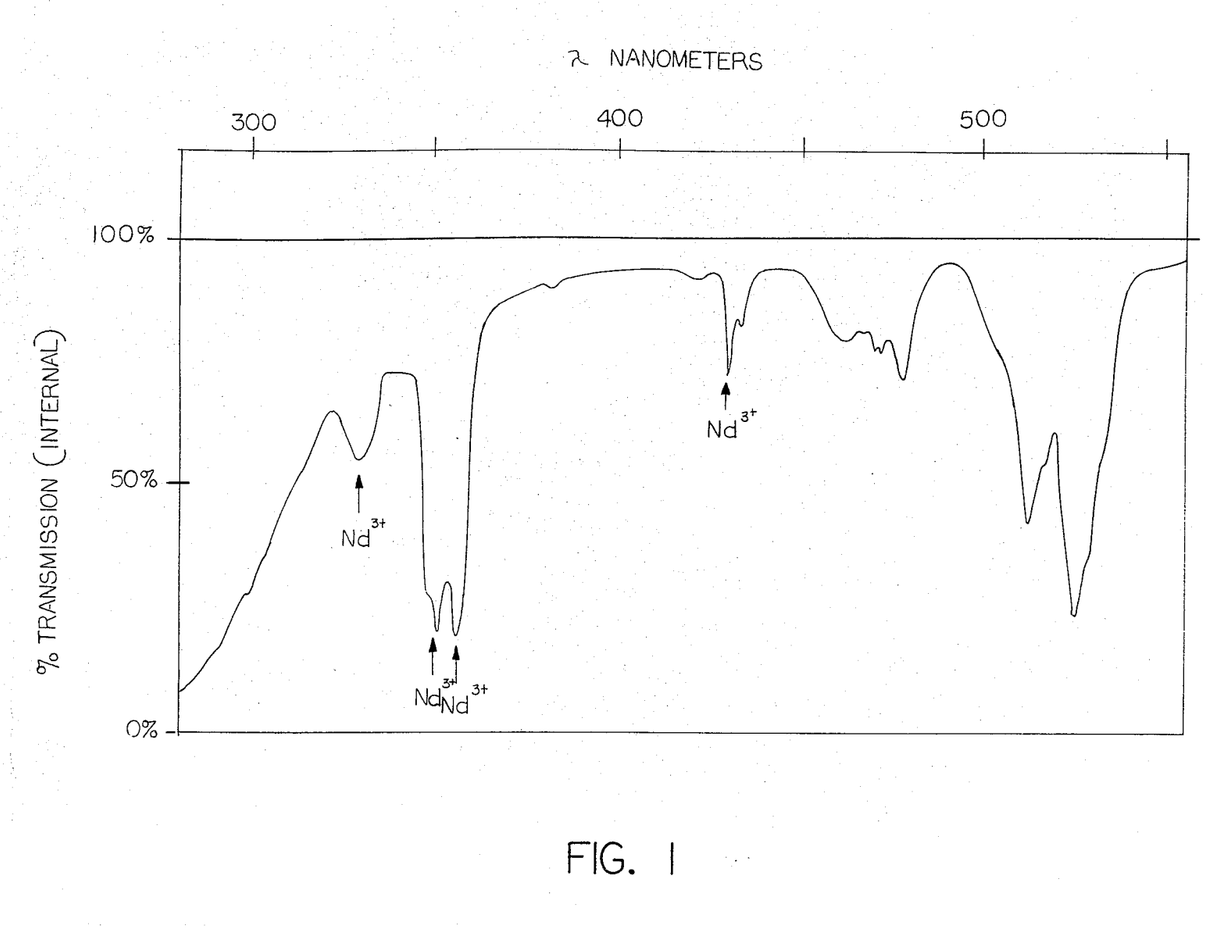
FIG. 1 is the transmission spectrum of composition 1.
Figure 2:
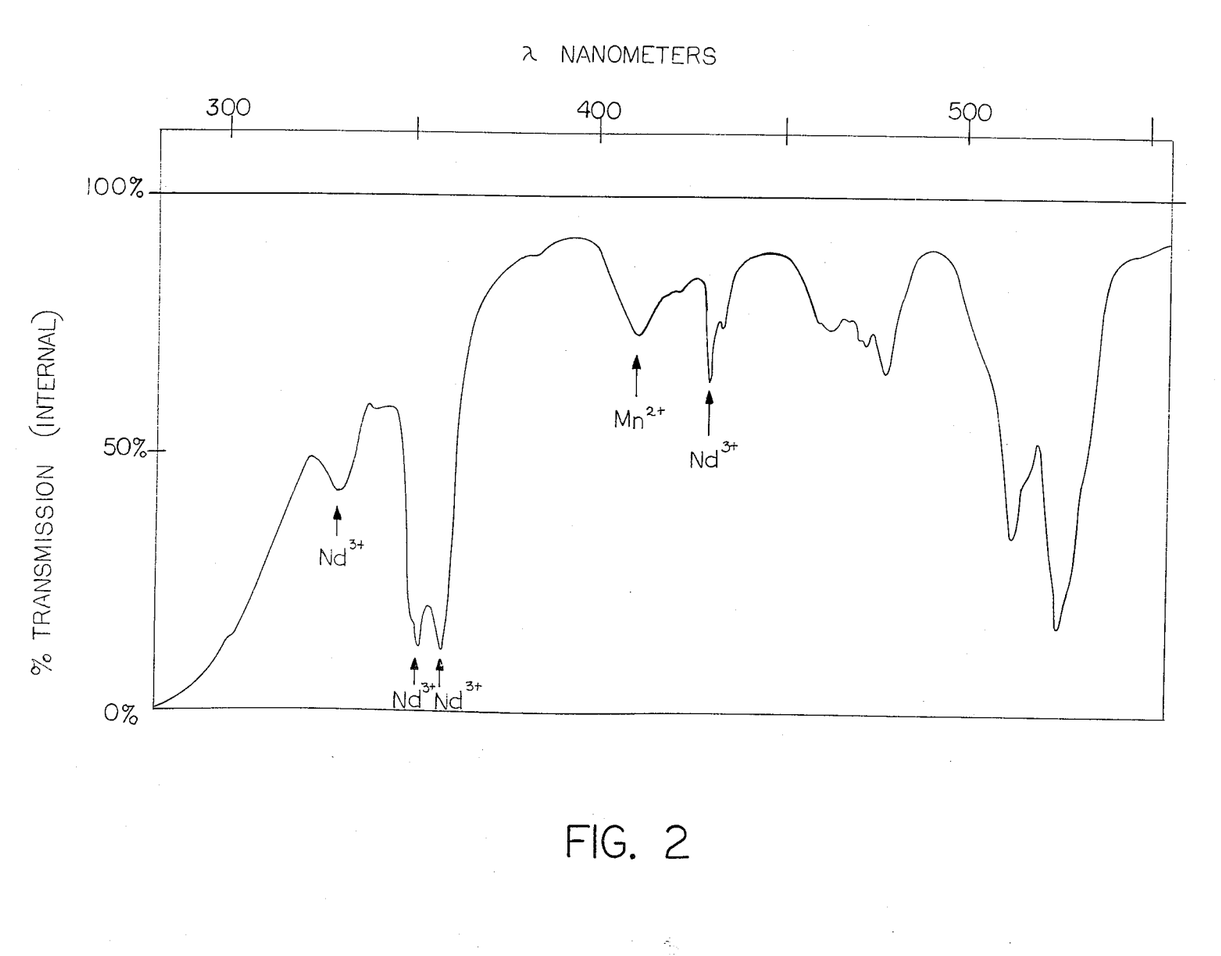
FIG. 2 is the transmission spectrum of composition 5.

As noted, FIGS. 1 and 2 show the transmission spectra from about 280 nm to 550 nm for the glasses of compositions 1 and 5, respectively.

The zero percent lines and the 100 percent lines (with the sample reflection removed) are shown in the figures. The four main $Nd^{3+}$ absorption bands between 300 nm and 450 nm are marked in FIG. 1. An important feature to note in the spectra is the lack of any significant $Nd^{3+}$ absorption bands from about 370 nm to about 425 nm. It is for this reason that the addition of MnO, which absorbs in this region, is useful for increasing the pumping efficiency of the $Nd^{3+}$.

In any event, the absorption spectrum of FIG. 1, for the glass containing no manganese oxide, should be compared to the spectra of FIG. 2, of a similar glass composition (No. 5 in Table 1) in which spectra the same main absorption bands of $Nd^{3+}$ are shown, plus the $Mn^{2+}$ band which lies in the desired region and absorbs strongly between 400 and 425 nm. Thus, this absorbed energy is transferred to the $Nd^{3+}$ and it increases the output from the $Nd^{3+}$ in response to wavelengths which would otherwise be essentially lost.

Figure 3:
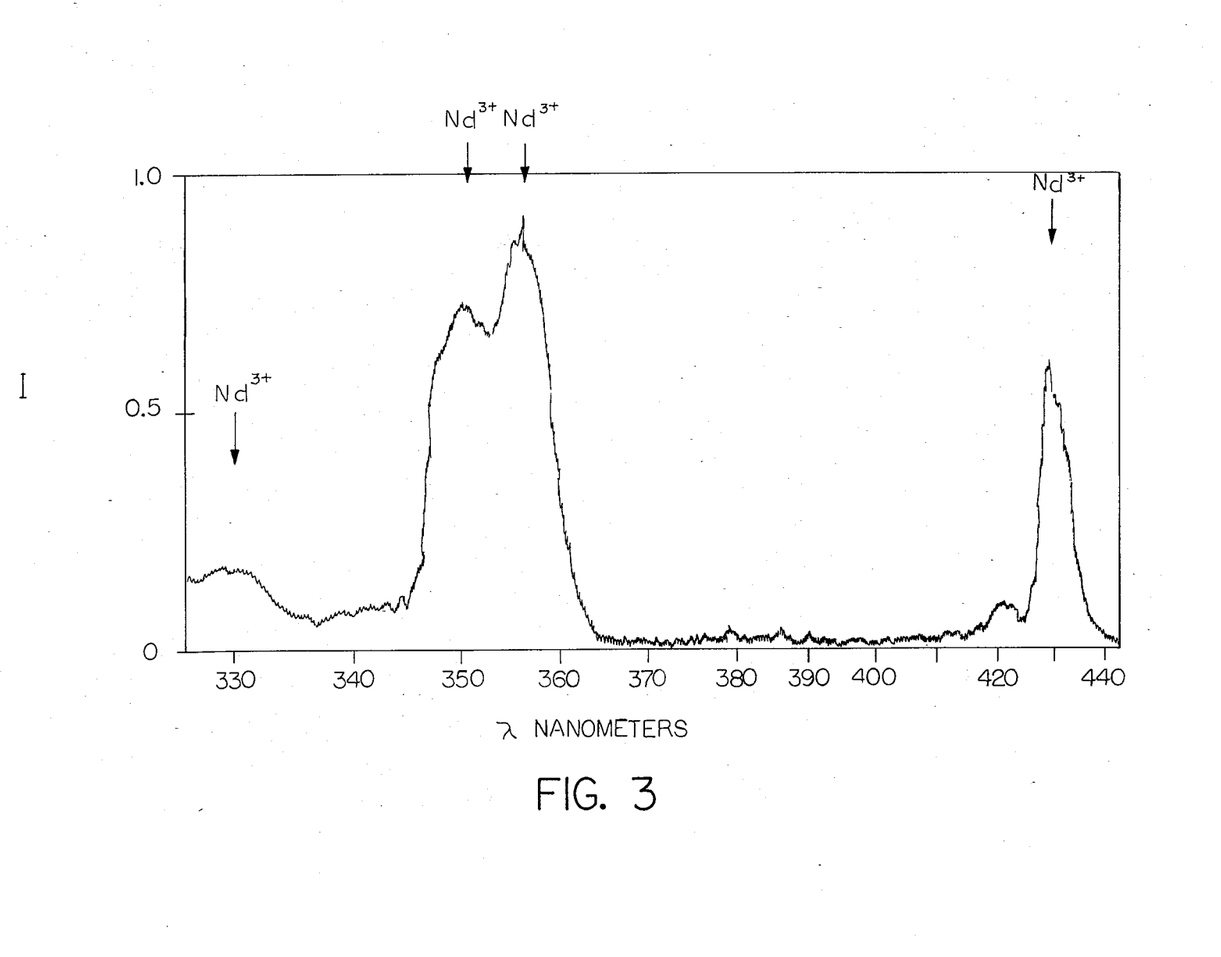
FIG. 3 is the excitation spectrum of composition 1.

FIG. 3 shows the excitation spectrum of the glass composition 1 in Table 1. This figure is a recording of the fluorescent intensity of the $Nd^{3+}$ fluorescence at 1.06 microns when the sample is excited at the different individual wavelengths between 330 nm and 440 nm. As can be seen, when light of a wavelength corresponding to an $Nd^{3+}$ absorption band is directed on the sample, significant $Nd^{3+}$ fluorescence at 1.06 microns is observed. The same four $Nd^{3+}$ bands can be seen in FIG. 3 as are marked in FIG. 1.

Figure 4:
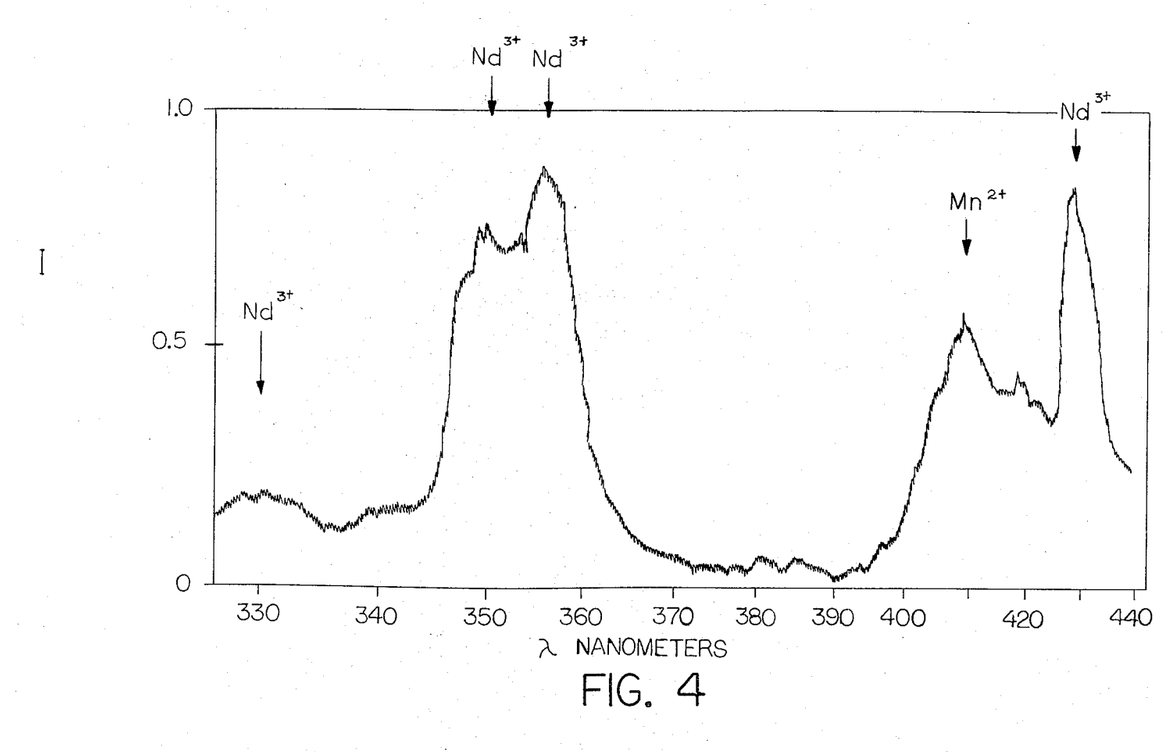
FIG. 4 is the excitation spectrum of composition 5.
Figure 5:
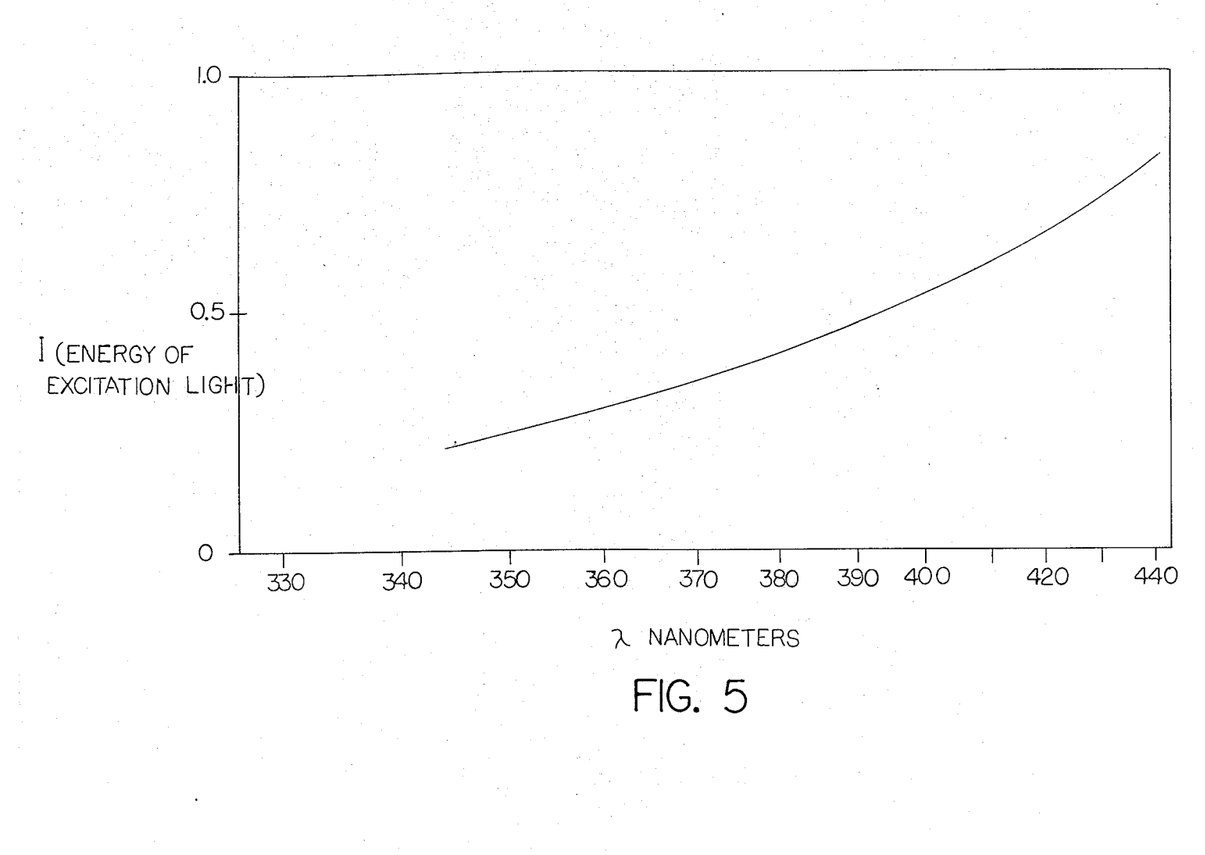
FIG. 5 shows the light intensity curve of the light used for the excitation spectra obained in the experimental setup shown in FIG. 6.

FIG. 4 shows the excitation spectrum of the glass composition 5 of Table 1. The same four $Nd^{3+}$ bands are evident in this spectrum. However, the $Mn^{2+}$ band is also obvious. This means that when light is absorbed by the $Mn^{2+}$ at about 4100 Å, $Nd^{3+}$ fluorescence is observed at 10600Å. A separate experiment showed that no 10600Å fluorescence was apparent from a sample glass doped only with $Mn^{2+}$ but no $Nd^{3+}$, confirming that the $Mn^{2+}$ is acting as a sensitizer for the $Nd^{3+}$. Thus, the output energy from the $Mn^{2+}$ is exciting the $Nd^{3+}$, causing fluorescence at 10600Å.

Referring again to Table 1, it will be noted that the relative pumping efficiency at various pumping wavelengths is shown for a number of the glass compositions. These values were determined using the experimental setup of FIG. 6. FIG. 6 is essentially self-explanatory. The xenon arc lamp was operated for the test and passed light of the desired wavelength through the monochrometer. To obtain a measure of the light incident on the sample of the glass, the sample was removed and the monochromatic light passed directly onto the silicon detector. For the other measurements the sample was in place, of course. The transmission measurements were made with the sample in place and the silicon detector current was a measure of the light transmitted. The fluorescent light, including the light at 1.06 microns, was passed through the narrow band pass filter, which excluded the other wavelengths, to a photomultiplier and a recorder to measure the energy or intensity of the output of 1.06 micron radiation on exposure to each of the wavelengths indicated in Table 1 and in Table 3.

In Table 3 is an example of the procedure to arrive at the relative pumping efficiencies shown in Table 1. In Table 3 the results are for the tests on composition 5 of Table 1.

It will be noted in Table 3, as well as in Table 1, that the relative pumping efficiency, normalized as indicated, was 0.69 for composition 5 when exposed to radiation of 4100 Å. This means that 69 percent of the photons absorbed by the composition, specifically by the divalent manganese, was transferred to the trivalent neodymium. Composition 5 can be compared with composition 1. Composition 1 contained no manganese and composition 5 represents a replacement of the barium oxide in composition 1 with manganese oxide. It will be noted that in composition 1 not enough energy was transferred at 4100 Å to be measured. Similarly, composition 4 can be compared to composition 1; thus, composition 4 represents a replacement of a small amount of the barium oxide by manganese oxide.

The results in composition 7 can be compared to the control composition 6, and the results in compositions 9 and 10 can be compared to the control composition 8.

Most important is the fact that the compositions 3, 4, 5, 7, 9, 10, 13, 16 and 17 of the invention showed no absorption band in their spectrographic analysis due to higher oxides of manganese that would absorb the fluorescence emissions of neodymium occuring at 0.9, 1.06 and 1.35 microns. Furthermore, all of the glasses of the invention could be melted in platinum in a non-reducing ambient atmosphere and thus not disintegrate the platinum or obtain gross inclusions of platinum in the fluorescent glass.

In U.S. Pat. No. 3,549,554, the preparation of fluorescent glasses containing neodymium oxide and manganese oxide, containing arsenic oxide, is described. Antimony oxide is also suggested in place of arsenic oxide. The glasses, however, were melted under highly reducing conditions, using ammonium phosphate and manganese acetate batch ingredients. Melting was conducted in silica crucibles. As is disclosed in the final technical report in Contract No. Da-01-021-AMC-12353(Z) between the United States Government and Westinghouse Electric Corporation, entitled "High Energy Glass Laser Materials", dated Aug. 6, 1966, available from the Defense Documentation Center, AD No. 802691, such highly reducing atmospheres were thought to be necessary to prevent the oxidation of MnO and such conditions resulted in destruction of platinum furnace materials. Furthermore, as is well known, very high quality optical glasses cannot be made in a refractory because constant even though small solution of the refractory into the glass melt prevents the formation of the necessary highly homogeneous glass. Moreover, melting glasses under highly reducing atmospheres in refractories results in hazy glasses, not acceptable for most optical applications.

Because of the highly reducing conditions thought necessary in the Westinghouse report, this report concluded that it was not possible to use platinum crucibles under such conditions. In a process of the present invention, of course, platinum metal or platinum alloy crucibles can successfully be used, with increased optical quality of the glass.

As will be evident to those skilled in the art, various modifications of this invention can be made or followed in the light of the foregoing disclosure and discussion without departing from the spirit and scope of the disclosure or from the scope of the claims.

I claim:

1. In the method of preparing an inorganic luminescent glass which (1) contains $Nd_2O_3$ as a fluorescent species, sensitized by MnO, and (2) is essentially free of oxides of Mn having a valence greater than +2, the improvement which comprises essentially eliminating such higher valence Mn oxides inherently present in such a glass in the molten state, by providing as an internal reducing agent homogeneously dissolved in a melt of such a glass, an oxide of a metal more easily oxidized than MnO, as essentially the sole effective agent for eliminating from said glass such higher oxides of Mn present in the glass melt, and cooling said glass melt to a solid glass, during which cooling the said higher oxides of Mn present in the glass melt are reduced by said internal reducing agent.

2. An improvement of claim 1 wherein the melting furnace or container material in contact with said melt is platinum or a platinum alloy and the atmosphere in contact with said melt is non-reducing.

3. An improvement of claim 1 wherein the ambient atmosphere in contact with said glass melt is non-reducing.

4. An improvement according to claim 1 wherein said internal reducing agent is selected from tin oxide, antimony oxide and arsenic oxide.

5. An improvement of claim 1 wherein said internal reducing agent is tin oxide.

6. An improvement of claim 1 wherein said internal reducing agent is antimony oxide.

7. An improvement according to claim 1 wherein the ambient atmosphere in contact with said glass melt is oxidizing.

8. An improvement according to claim 2 wherein said internal reducing agent is selected from tin oxide, antimony oxide and arsenic oxide.

9. An improvement of claim 2 wherein said internal reducing agent is tin oxide.

10. An improvement of claim 2 wherein said internal reducing agent is antimony oxide.

11. An improvement according to claim 2 wherein the ambient atmosphere in contact with said glass melt is oxidizing.

12. An improvement according to claim 3 wherein the ambient atmosphere in contact with said glass melt is oxidizing.

13. An improvement according to claim 3 wherein said internal reducing agent is selected from tin oxide, antimony oxide and arsenic oxide.

14. An improvement according to claim 13 wherein the ambient atmosphere in contact with said glass melt is oxidizing.

* * * * *